Figure 1:
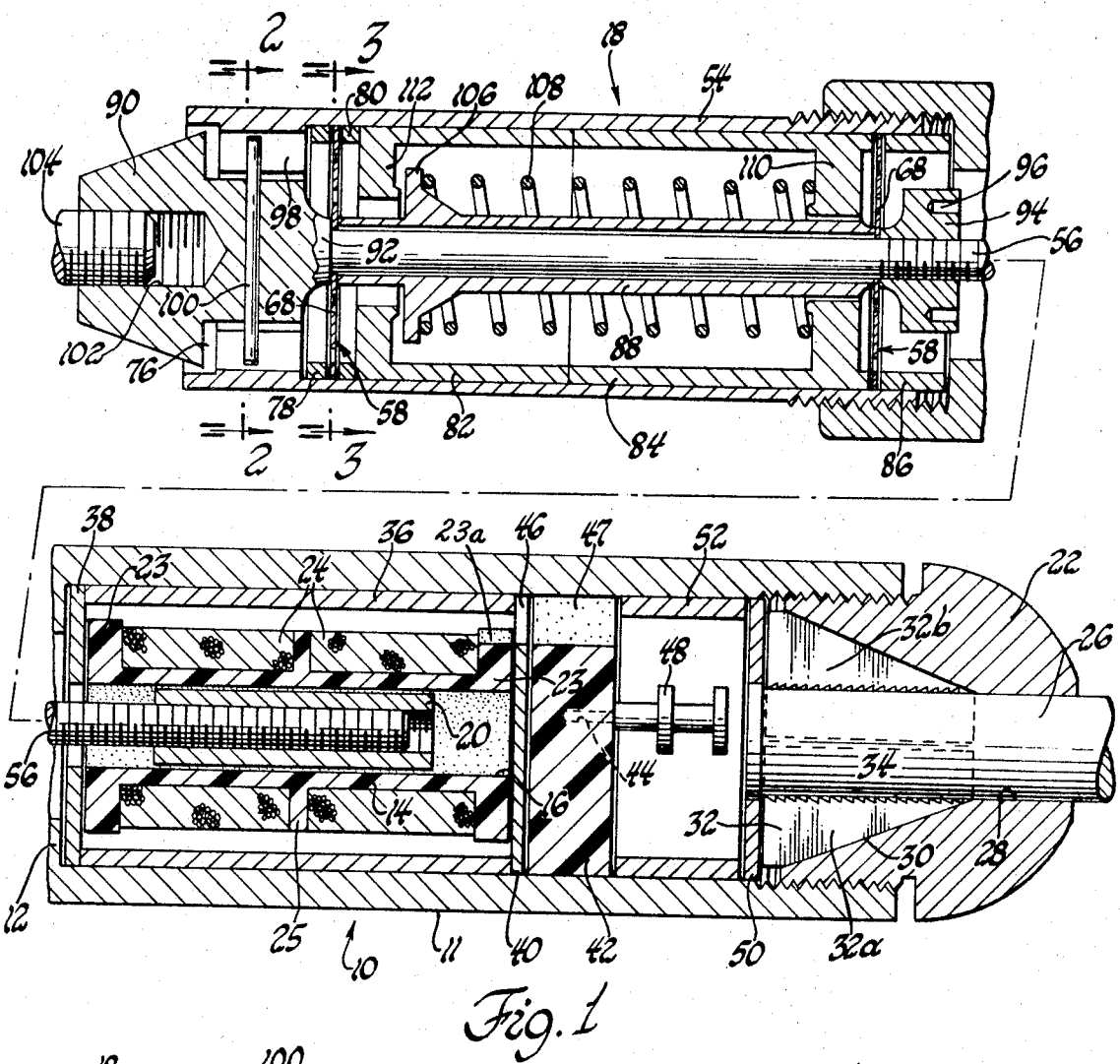

[11] 3,573,513

[72] Inventors  Thomas D. Hayosh
                Bloomfield Hills;
                Keith R. Jenkin, Sterling Heights, Mich.
[21] Appl. No. 752,685
[22] Filed     Aug. 14, 1968
[45] Patented  Apr. 6, 1971
[73] Assignee  Speedring Corporation
                Warren, Mich.

[54] ELECTROMECHANICAL TRANSDUCER
     15 Claims, 3 Drawing Figs.
[52] U.S. Cl.................................................. 310/14,
                                                              310/15
[51] Int. Cl..................................................... H02k 35/02
[50] Field of Search........................................... 310/12;
     335/273, 271, 275, 298, 263; 73/71, 71.5; 310/28,
            30, 15, 17, 27, 34, 35, 47, 50, 60; 310/71

[56]             References Cited
              UNITED STATES PATENTS
| | | | |
|---|---|---|---|
| 1,128,036 | 2/1915 | Paulero | 310/30 |
| 1,966,446 | 7/1934 | Hayes | 310/30X |
| 3,155,851 | 11/1964 | Francis | 310/13 |
| 2,268,687 | 1/1942 | Young | 310/30 |
| 3,012,158 | 12/1961 | Bender | 310/30 |
| 3,109,906 | 11/1963 | Abendroth | 335/273X |
| 3,103,603 | 9/1963 | Reutter | 310/30 |
| 2,591,795 | 4/1952 | Eisler | 310/27X |
| 3,067,404 | 12/1962 | Hildebrandt | 310/27X |
| 1,164,475 | 12/1915 | Croston | 310/30X |
| 2,623,940 | 12/1952 | Templeman | 310/30X |
| 2,632,791 | 3/1953 | Side | 310/30X |
| 2,890,438 | 6/1959 | Bardeen | 310/15X |
| 3,132,268 | 5/1964 | Abel et al. | 310/15 |
| 3,024,374 | 3/1962 | Stauder | 310/14X |
| 3,135,880 | 6/1964 | Olsen et al. | 310/14 |
| 3,259,769 | 7/1966 | Stott | 310/14 |
| 3,094,635 | 6/1963 | Wysocki | 310/12 |
| 3,433,983 | 3/1969 | Keistman et al. | 310/12X |
| 2,469,137 | 5/1949 | Strong | 310/30UX |
| 3,099,260 | 7/1963 | Birtwell | 310/15UX |

*Primary Examiner*—Milton O. Hirshfield
*Assistant Examiner*—B. A. Reynolds
*Attorney*—Barnard, McGlynn and Reising

ABSTRACT: An electromechanical transducer including a coil supporting assembly and an armature supporting assembly detachably connected together. The coil supporting assembly includes a cylindrical casing with an internal shoulder, and a coil winding support member is clamped against the shoulder by an adjustable cap. The armature is mounted on a rod supported on a pair of diaphragm springs for relatively free axial movement but is restrained against radial and rotative movement.

Patented April 6, 1971

3,573,513

INVENTORS
Thomas D. Hayosh, &
BY Keith R. Jenkin

Barnard, McGlynn & Reising
ATTORNEY

ELECTROMECHANICAL TRANSDUCER

This invention relates generally to transducers, and is particularly concerned with transducers operable to produce an electrical signal which is a function of linear displacement by utilizing the change in the difference of two self-inductances or mutually coupled inductances produced by a movable magnetic element herein known as the armature.

Modern scientific and industrial operations are generally dependent to some degree on the accurate measurement and control of mechanical quantities. Many of these quantities can be measured directly in terms of a distance or linear displacement. Displacement or distance can be converted to an electrical response for the purpose of remote indication or control. Electromechanical transducers used for this function include those utilizing the change in the difference of two self-inductances, or mutually coupled inductances produced by a movable magnetic element.

Such instruments may include a coil winding supported on a hollow cylindrical member with a core element or armature projecting into the hollow cylindrical member. Relative axial movement between the armature and coil produces an electrical signal. Generally, the armature is supported for axial movement relative to the coil winding and is biased to a null or neutral position in which the electrical signal is zero. Movement of the armature produces a signal that varies with linear displacement of the armature from the null position.

The armature may be mounted on a rod supported on one or more diaphragm springs or the like such that the armature assumes the electrically neutral position within the hollow cylinder around which the coil winding is supported. The armature, therefore, must be free to move axially within the hollow cylinder. A workpiece engaging sensing member or indicator may be attached to the armature supporting rod for causing axial movement of the armature in accordance with irregularities in the surface of the workpiece. Electrical signals produced by movement of the armature from its null position are transmitted through wires from the coil windings to an amplifier utilizing a meter or other relative indicating device where the signal may be indicated in units of distance or displacement, for example, as millionths of an inch.

Acceptable accuracy in such transducers requires that the armature must be supported in such a manner that it can move relatively freely in an axial direction, but is restrained against movement or deflection in a radial or transverse direction, and there must be no frictional engagement between the armature and the coil support member. At the same time, economic requirements such as ease of assembly and disassembly without damage to the parts, and ease of calibration, bust be met. Presently available transducers of this type are expensive, difficult to assemble and disassemble, and are difficult to calibrate.

It is, therefore, one of the objects of this invention to provide an electromechanical transducer that can be easily assembled and disassembled for adjustment, calibration and replacement of parts.

A further object is to provide an electromechanical transducer having parts so arranged that they can be assembled and calibrated with a minimum amount of stress being applied to the more sensitive and delicate parts, and which, at the same time, meets the required standards of accuracy.

Another object is to provide an electromechanical transducer in which a coil supporting member is releasably clamped in position within a housing and can be selectively adjusted radially to bring it into the required coaxial relationship with an armature member merely by releasing clamping means and retightening the clamping means when the coil support is in the proper position.

Another object is to provide an electromechanical transducer having a movable armature member which is freely movable in an axial direction relative to a coil supporting member to produce an electrical signal, and which is restrained against radial and twisting movement so as to protect it from injury.

Yet another object lies in the provision of an electromechanical transducer having a housing for a coil and coil supporting member in which the coil supporting member can be releasably clamped in position and can be adjusted in a radial or transverse direction, an armature supporting means detachably mounted on the housing with an armature mounted for coaxial movement relative to the coil support member to produce an electrical signal proportional to the displacement of the armature from a null position relative to the coil.

In carrying out the foregoing, and other objects, an electromechanical transducer according to the present invention includes a housing for a coil winding support member. The support member is of such size relative to the housing that it can be adjusted radially or transversely, and is releasably clamped in position against a shoulder in the housing. An armature supporting casing is attached to the housing to dispose an armature in coaxial relationship with the coil support member. To obtain proper alignment and calibration, the clamping means can be released to adjust the position of the coil support member and the armature can be axially adjusted on an armature supporting rod.

The transducer basically consists of two assemblies which can be detachably connected with each other; namely, an armature supporting assembly, and a coil winding supporting assembly. The armature supporting assembly includes a casing in which is mounted a pair of axially spaced diaphragm springs carrying an armature supporting rod. The diaphragm springs have their peripheries secured against movement relative to the casing, and the armature supporting rod is secured against movement relative to the central portions of the diaphragm springs. To prevent torsional stresses from being applied to the springs through the rod, a transverse pin in the rod engages a slot in a shoulder of the casing to prevent relative rotation between the rod and casing without interfering with axial movement of the rod. The coil supporting assembly includes a housing threadedly connected with one end of the armature casing. A radially inwardly projecting annular shoulder in the housing provides an abutment for the coil supporting member, and an end cap threaded into the opposite end of the housing from the casing provides a clamping force in cooperation with the shoulder to releasably clamp the coil support member in a desired position. A conical recess in the end cap cooperates with a conical collet to releasably clamp the end of an electrical conductor from the coil winding to prevent it from being separated from the housing. The coil windings are enclosed by a magnetic shielding sleeve and are shielded at their ends by magnetic shielding washers and discs.

The invention may, for example, be incorporated in a linear variable differential transformer wherein a pair of secondary windings are mounted on a coil support member and connected differentially, and a primary winding is also wound on the coil support member with the secondaries. When the armature is in a null position the output is zero due to the differential connection of the secondaries. However, when the armature is displaced from the null position, the balance is upset to produce a signal proportional to the amount of displacement of the armature from the null position.

Figure 2:
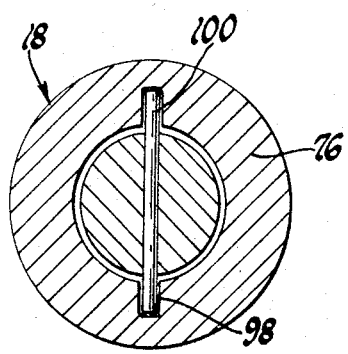
Figure 3:
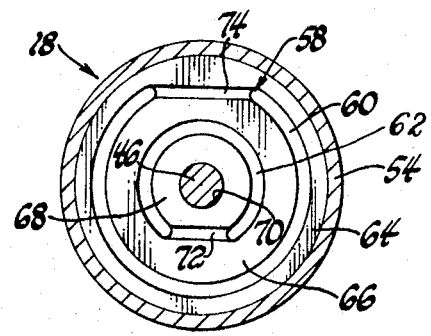

Other objects, advantages and features of the invention will become apparent from the following description taken in connection with the accompanying drawings in which:

FIG. 1 is a longitudinal sectional view of an electromechanical transducer embodying the invention; and FIGS. 2 and 3 are transverse sectional views taken on lines 2—2 and 3—3, respectively, of FIG. 1.

With reference to the drawings, reference numeral 10 designates a coil supporting assembly including a cylindrical housing 11. An annular shoulder 12 projects radially inwardly from the inner wall of the housing. Received in the housing is a coil supporting member 14 having an axial passage 16 formed therein. Mounted on the housing is armature support assembly 18 including an armature 20 which is received in the axial passage 16 of the coil support member 14. The coil support member 14 is releasably secured in position in the housing 11 by clamping means including an adjustable end cap 22 threadedly mounted on one end of housing 11. Thus, end cap 22 is adjustable toward and away from shoulder 12 to respectively clamp and release the coil support member relative to shoulder 12. The coil support member 14 has an outer diameter sufficiently small to permit it to be transversely adjusted in the housing to bring it into coaxial relationship with the armature 20.

The coil support member 14 is formed with radially outwardly projecting end flanges 23 and a radially outwardly projecting intermediate flange 25. Coil windings 24 are supported on the coil support member 14. The right hand end flange 23, as viewed in the drawings, is provided with a longitudinal slot 23a in its upper periphery as shown in FIG. 1. In a manner described herein below, the coil windings 24 are electrically connected with an electrical conductor 26, and electrical signals generated by movement of armature 20 from its null position relative to the coil windings are transmitted externally of the housing to a meter or the like. The end cap 22 is formed with an axial opening 28 for receiving the conductor 26, and the opening 28 connects with a frustoconical recess 30 formed in the end cap 22 for receiving a frustoconical collet 32 for securing the electrical conductor 26 against movement relative to the end cap and for preventing the conduit from being separated from the housing 11. The frustoconical collet 32 is preferably separated into a pair of complementary halves 32a and 32b each having serrations 34 formed on their inner conduit engaging surfaces (of semicircular cross section) so that movement of the end cap 22 in a direction to clamp the coil support member 14 against shoulder 12 causes radial, inward compression of the collet halves toward each other to firmly grip the conductor 26.

The coil supporting member 14 and coil windings 24 are surrounded by a cylindrical magnetic shielding sleeve 36 having an inner diameter sufficiently greater than the outer diameter of the coils 24 and coil support member 14 to permit transverse adjustment of the coil supporting member within the shielding sleeve 36. The coils are further magnetically shielded by a magnetic shielding washer 38 seated between the end of sleeve 36 and shoulder 12, as well as a shielding disc 40 seated between the opposite end of the sleeve and a terminal support member 42. The terminal support member 42 is formed with terminal receiving openings 44 (only one such opening being illustrated in the drawing), and wires from the coil windings 24 pass over slots 23a, 46 and 47 in the flange 23, disc 40 and terminal support member 42, respectively, and are soldered in position in the terminal receiving openings 44. Terminals 48 (only one being shown in the drawing) are mounted in the terminal receiving openings 44 and are electrically connected with the conduit 26. Terminal 48 is surrounded by a cylindrical spacing member 52, and a clamping washer 50 is received between the end of spacer 52 and collet 32. Thus, adjustment of the end cap 22 toward the annular shoulder 12 produces a clamping force to hold the parts in assembled relationship.

The armature supporting assembly 18 includes a cylindrical casing 54 threadedly mounted on one end of the housing 11. An armature supporting rod 56 is mounted within casing 54 on a pair of axially spaced diaphragm springs 58. The diaphragm springs 58 are constructed in accordance with the springs disclosed in the copending application of Keith R. Jenkin entitled "Diaphragm Spring," filed concurrently herewith, Ser. No. 752,686, the entire disclosure of which is incorporated herein by reference. As shown more clearly is FIG. 3, each diaphragm spring 58 is divided into a peripheral leaf portion 64, an intermediate leaf portion 66 and a central leaf portion 68 by arcuate slots 60 and 62. The ends of the slots terminate at the edges of webs or hinge portions joining adjacent pairs of the leaf portions along a portion of their peripheries. Leaf portion 64 is thus joined to leaf portion 66 by a hinge portion 74, and leaf portion 66 is joined to the central leaf portion 68 by hinge portion 72. The central leaf portion 68 is provided with an axial opening 70 through which the armature supporting rod 56 passes. The hinge portions 72 and 74 are angularly spaced from each other so that the leaf portions deflect relative to each other in the manner of a lever. The hinge portions are reduced in thickness and are spaced angularly from each other 180° to provide greater flexibility of the leaf portions with respect to each other. Thus, the springs 58 can flex relatively freely in an axial direction while at the same time providing a rigid support for the rod in a radial or transverse direction.

The diaphragm springs 58 are spaced from each other along the longitudinal axis of the extension member and are restrained against movement relative to the cylindrical support member at their peripheries. An annular shoulder 76 projects radially inwardly from the inner wall of the casing. A first spacer ring 78 is seated against the annular shoulder 76, and the peripheral portion of the left-hand diaphragm spring 58 (as viewed in the drawing) is received between spacer ring 78 and a second spacer ring 80. A first cylindrical sleeve 82 supported on the inner wall of the casing 54 has one end in engagement with the second spacer ring 80 and its other end in engagement with one end of a second cylindrical sleeve 84 supported on the inner wall of the casing. The peripheral portion of the right-hand diaphragm spring 58 is received between the other end of sleeve 84 and a third spacer ring 86. Shoulder 12 on housing 11 engages the spacer ring 86 to clamp spacer rings 78,80,86, the peripheries of the diaphragm springs 58, and sleeves 82 and 84 against shoulder 76 of casing 54.

Rod 56 is secured against movement relative to the central portions of the diaphragm springs 58 by a floating sleeve or tubular member 88 mounted on said rod between the diaphragm springs 58; thus, one end of the floating sleeve or tubular member 88 engages the inner side of the central portion 68 of the left-hand diaphragm spring 58 on the opposite side of a shoulder 92 formed on an adapter portion 90 of rod 56. The other end of sleeve 88 engages the inner side of the central portion of the right-hand diaphragm spring 58 and cooperates with a clamping nut 94 screwed onto the rod 56. Nut 94 is provided with recesses 96 for receiving a tool for adjusting the nut along the threaded portion of rod 56.

The enlarged adapter portion 90 of rod 56 is provided with a tapped hole 102 for threadedly receiving one end of a sensing element 104 for engaging a workpiece or the like. In order to prevent torsional forces from being applied to the diaphragm springs 58, a diametrical slot 98 extending longitudinally parallel to the longitudinal axis of casing 54 is provided in the shoulder 76, and a transverse pin 100 is mounted in the adapter portion 90 of rod 56 for engagement with the slot. Pin 100 permits free axial movement of rod 56 but prevents rotation of the rod relative to the diaphragm springs or to the casing 54.

Sleeve 88 is formed with a movable spring seat flange 106 adjacent its left end as viewed in FIG. 1 which cooperates with a fixed spring seat flange 110 formed on sleeve 84 to provide seats for a coil spring 108. Spring 108 biases rod 56 to a neutral position in which the diaphragm springs are unflexed and in which the armature 20 and coils 24 are in an electrically neutral or null position. A stop flange 112 is formed on the left end of sleeve 86 which cooperates with flange 106 to limit the displacement of rod 56 toward the left.

As shown in the drawing, the armature 20 has an internally threaded passage for threaded engagement with the threaded portion of rod 56. Thus, the armature can be calibrated along the length of rod 56. The armature support assembly 18 can be separated from the coil supporting assembly 10 by disengaging the threads of the casing 54 from the internally threaded opening of housing 10. Adjustment of the transverse position of the coil support member 14 can be accomplished by loosening the end cap 22 to release the clamping pressure on the coil support member 14 and thereby permit it to be adjusted in a transverse direction to assure a coaxial relationship with the armature 20. When it is adjusted to the proper position, the end cap 22 is retightened to secure the parts together.

While a specific example of the invention has been illustrated and described in the accompanying drawings and the foregoing specification, it should be understood that the invention is not limited to the exact construction shown. Alternatives in the construction and arrangement of parts can be made by those skilled in the art without departing from the scope and spirit of the invention.

We claim:

The embodiments of the invention in which an exclusive property or privilege is claimed are defined as follows:

1. An electromechanical transducer assembly comprising: a cylindrical housing; a radially inwardly projecting annular shoulder on the inner wall of said housing; a coil support member received in said housing, said coil support member having an axial passage; armature support means mounted on said housing; an armature supported on said armature support means for axial movement, said armature being received in the axial passage of said coil support member for axial movement relative thereto; the outer surface of said coil support member being spaced from the inner surface of said housing to permit transverse adjustment of said coil support member in said housing to bring the axial passage of the coil support member into coaxial relationship with said armature; an end cap threadedly mounted on said housing for adjustment toward said shoulder to clamp the coil support member against movement relative to said housing and for adjustment away from said shoulder to release said coil support member and permit transverse adjustment thereof; coil windings supported on said coil support member, a conductor extending from said housing and electrically connected with said coil windings; said end cap having an axial opening receiving said conductor; a frustoconical recess formed in said end cap coaxial with said axial opening, said conical recess having its large end at the end of said end cap toward said annular shoulder and its small end merging with said axial opening; a frustoconical collet received in said frustoconical recess, said collet having an axial opening receiving said conductor, and said collet being radially compressible by the complementary surface of said frustoconical recess to grip said conductor when clamping force is applied to the coil support member by said end cap.

2. An electromechanical transducer assembly as claimed in claim 1 wherein said collet is separated into a pair of complementary halves that are forced toward each other to grip said conductor in response to the clamping force applied to said coil support member by said end cap.

3. An electromechanical transducer assembly as claimed in claim 2 further including serrations formed on the axial opening of said collet for engaging said conductor.

4. An electromechanical transducer assembly as claimed in claim 2 further including a cylindrical magnetic shielding sleeve received in said housing, said coil support member being received in said sleeve, said sleeve having an inner diameter sufficient to permit transverse adjustment of said coil support member relative to said sleeve.

5. An electromechanical transducer assembly as claimed in claim 4 further including an annular magnetic shielding washer received between said annular shoulder and one end of said coil support member, and a magnetic shielding disc seated against the other end of said coil support member, said shielding sleeve, washer and disc cooperating to enclose the coil windings in a magnetic shield.

6. An electromechanical transducer assembly as claimed in claim 5 further including a terminal support seated against said shielding disc on the opposite side thereof from said other end of the coil support member, said terminal support being formed with terminal receiving openings, said shielding disc having a slot, and wires extending from said coil windings and passing through said slots and received in said terminal receiving openings.

7. An electromechanical transducer assembly as claimed in claim 6 further including a terminal received in each of said terminal receiving openings and projecting generally axially toward said end cap; an annular clamping washer seated against the large end of said collet, and a cylindrical spacer seated between said clamping washer and terminal support for receiving said terminals, said conductor being electrically connected with said terminals.

8. An electromechanical transducer assembly comprising: a cylindrical casing; a pair of circular diaphragm springs mounted in said casing, said diaphragm springs being spaced from each other along the longitudinal axis of said casing and restrained against movement at their respective peripheries; an opening in the central portion of each of said diaphragm springs; an armature supporting rod received in said openings; a sleeve mounted on said rod between said diaphragm springs with its opposite ends abutting the opposed central portions of said pair of diaphragm springs; an enlarged adapter portion formed on one end of said rod and defining a shoulder therewith engaging the opposite side of the central portion of one of said diaphragm springs from said sleeve; a clamping nut threadedly mounted on said rod and engaging the opposite side of the central portion of the other of said diaphragm springs; a radially inwardly projecting annular shoulder on the inner wall of said casing; a longitudinal slot formed in said annular shoulder; a transverse pin mounted in said rod engaged with said slot to prevent rotation of said rod relative to said casing and diaphragm springs.

9. An electromechanical transducer assembly as claimed in claim 8 further including a fixed spring seat flange extending radially inwardly from the inner wall of the supporting member between said diaphragm springs; a movable spring seat flange projecting radially outwardly from said sleeve; and a coil spring seated between said fixed and movable spring seat flanges and surrounding said sleeve to bias said rod to a neutral position.

10. An electromechanical transducer assembly as claimed in claim 9 further including a tubular housing detachably mounted on one end of said casing; a coil support member received in said housing, said coil support member having an axial passage, and said rod projecting axially into said axial passage.

11. An electromechanical transducer assembly as claimed in claim 10 further including coil windings on said coil supporting member, an armature supported on said rod in said axial passage, a conductor attached to said housing and electrically connected with said coil windings, a radially inwardly projecting annular shoulder on the inner wall of said housing; and end cap threadedly mounted on said housing for selective adjustment toward said shoulder to clamp the coil support member against said shoulder, and for selective adjustment away from said shoulder to release said coil support member, said end cap having an axial opening receiving said conductor; a frustoconical recess formed in said end cap coaxial with said axial opening, said conical recess having its large end at the end of said end cap toward said annular shoulder and its small end merging with said axial opening; a frustoconical collet received in said frustoconical recess; said collet having an axial opening receiving said conductor, and being separated into a pair of complementary halves that are forced toward each other to grip said conductor in response to the clamping force applied to said coil support member by said end cap.

12. An electromechanical transducer assembly including: a cylindrical casing; a pair of diaphragm springs mounted in said casing in axially spaced relationship; restraining means securing the peripheries of said diaphragm springs against movement relative to said casing; an opening in the central portion of each of said diaphragm springs; an armature supporting rod received in said openings; a tubular member mounted on said rod between said diaphragm springs with its opposite ends abutting the opposed inner sides of the central portions of said diaphragm springs; an enlarged adapter portion formed on one end of said rod and defining a shoulder engaging the outer side of the central portion of one of said diaphragm springs opposite said tubular member; clamping means mounted on said rod engaging the outer side of the central portion of the other of said diaphragm springs opposite said tubular member; a fixed spring seat in said casing between said diaphragm springs; a movable spring seat on said tubular member; and a coil spring seated between said fixed and movable spring seats biasing said rod to a neutral position.

13. An electromechanical transducer assembly as claimed in claim 12 further including a radially inwardly projecting annular shoulder on the inner wall of said casing; a longitudinal slot in said annular shoulder; and a pin projecting transversely from the adapter portion of said rod received in said slot to prevent relative rotation between said rod and said casing.

14. An electromechanical transducer assembly as claimed in claim 13 wherein said restraining means includes a first spacer ring located between said annular shoulder and the outer side of said one diaphragm spring engaging the periphery of said one diaphragm, a second spacer ring engaging the periphery of the inner side of said one diaphragm; a first sleeve engaged with said second spacer ring; a second sleeve engaged with said first sleeve; the periphery on the inner side of said other diaphragm spring being engaged with said second sleeve; a third spacer ring engaging the periphery of the outer side of said other diaphragm spring; and means engaging said third spacer ring to clamp said spacer rings, said sleeves and the peripheries of said diaphragm springs against the annular shoulder of said casing.

15. An electromechanical transducer assembly as claimed in claim 14 wherein said last named means includes a cylindrical housing threadedly mounted on said casing; and a radially inwardly projecting annular shoulder on the inner wall of said housing engaging said third spacer ring.